(12) United States Patent
Fuechtjohann et al.

(10) Patent No.: US 9,829,142 B2
(45) Date of Patent: Nov. 28, 2017

(54) INTERNALLY COATED LINER

(71) Applicant: SAERTEX multiCom GmbH, Saerbeck (DE)

(72) Inventors: Nils Fuechtjohann, Greven (DE); Frank Mersmann, Saerbeck (DE); Barbara Solzbacher, Steinfurt (DE)

(73) Assignee: SAERTEX multiCom GmbH, Saerbeck (DE)

( * ) Notice: Subject to any disclaimer, the term of this patent is extended or adjusted under 35 U.S.C. 154(b) by 412 days.

(21) Appl. No.: 13/624,024

(22) Filed: Sep. 21, 2012

(65) Prior Publication Data

US 2013/0074972 A1 Mar. 28, 2013

(30) Foreign Application Priority Data

Sep. 23, 2011 (EP) ..................................... 11182525

(51) Int. Cl.
*F16L 55/165* (2006.01)

(52) U.S. Cl.
CPC ....... *F16L 55/1656* (2013.01); *F16L 55/1651* (2013.01); *F16L 55/1652* (2013.01)

(58) Field of Classification Search
CPC F16L 55/1651; F16L 55/1652; F16L 55/1656
USPC ................................................... 138/98, 97
See application file for complete search history.

(56) References Cited

U.S. PATENT DOCUMENTS

| | | | | |
|---|---|---|---|---|
| 4,723,579 A | * | 2/1988 | Hyodo | B29C 63/343 138/119 |
| 4,758,454 A | * | 7/1988 | Wood | F16L 55/1656 138/137 |
| 5,186,987 A | * | 2/1993 | Imoto et al. | 428/34.5 |
| 5,411,060 A | * | 5/1995 | Chandler | B29C 63/34 138/103 |
| 6,374,862 B1 | * | 4/2002 | Schwert | F16L 55/1656 138/125 |
| 6,679,966 B1 | * | 1/2004 | Brandenburger | 156/190 |
| 7,478,650 B2 | * | 1/2009 | Pleydon et al. | 138/98 |
| 2005/0028880 A1 | | 2/2005 | Smith | |
| 2009/0217500 A1 | * | 9/2009 | Quigley | F16L 55/1652 29/402.09 |
| 2010/0075078 A1 | * | 3/2010 | Quitter | 428/35.2 |
| 2010/0243091 A1 | * | 9/2010 | D'Hulster | F16L 55/1651 138/97 |
| 2012/0145271 A1 | * | 6/2012 | McKeller | F16L 55/1656 138/98 |

FOREIGN PATENT DOCUMENTS

| | | |
|---|---|---|
| CA | 2230806 A1 | 2/1998 |
| DE | 19924251 A1 | 11/2000 |

(Continued)

OTHER PUBLICATIONS

European Patent Application No. 11182525.3, Search Report dated Jan. 13, 2012.

*Primary Examiner* — Paul R Durand
*Assistant Examiner* — Vishal Pancholi
(74) *Attorney, Agent, or Firm* — Hoffman Warnick LLC

(57) ABSTRACT

The present invention relates to an impregnated fiber tube, also referred to as a liner, for internally lining conduits and pipes, a method of manufacturing the fiber tube, a method of rehabilitating pipes, and use of the fiber tube for rehabilitating pipe.

15 Claims, 2 Drawing Sheets

(56) References Cited

FOREIGN PATENT DOCUMENTS

| | | |
|---|---|---|
| DE | 102009041841 A1 | 7/2010 |
| DE | 102009038628 A1 | 3/2011 |
| EP | 0863359 A1 | 9/1998 |
| EP | 1180225 A1 | 2/2002 |
| EP | 2253456 A1 | 11/2010 |
| WO | 9118234 A1 | 11/1991 |
| WO | 2010033297 A2 | 3/2010 |
| WO | 2010111025 A1 | 9/2010 |
| WO | 2011006618 A1 | 1/2011 |
| WO | 2012065698 A2 | 5/2012 |
| WO | 2013000556 A2 | 1/2013 |

\* cited by examiner

INTERNALLY COATED LINER

BACKGROUND OF THE INVENTION

Field of the Invention

The present invention relates to an impregnated fiber tube for internally lining conduits, sewers, and pipes, a method of manufacturing the fiber tube, a method of rehabilitating conduits, sewers, and pipes, and use of the fiber tube for rehabilitating conduits, sewers, and pipes.

Description of Related Art

Up to now pipes have been rehabilitated such that a polymeric inner tubular foil has been arranged in a resin-impregnated glass fiber-reinforced tube (liner), which inner tubular foil has been erected by means of compressed air to press the resin-impregnated fiber tube against the pipe wall. In prior art, the resin has then been hardened either by UV radiation or by action of heat (steam, hot water or IR).

In the case of UV hardening a device is normally drawn through the tube erected by compressed air. Either during this process or before during mounting of packers the polymeric inner tubular foil may be easily damaged. A production error during manufacture of the inner tubular foil cannot be precluded either. Even small defects allow compressed air to enter the only partially hardened liner, which, when the liner is completely hardened, inevitably results in a leaky end product. In the case of major defects (e.g. a bursting foil) the entire product collapses and hardening is impossible. These problems encountered with prior art foils require the hardened and leaky liner to be painstakingly milled out, or in the case of a burst foil the collapsed liner to be drawn out of the reach and disposed of. Both cases result in a considerable economic loss.

WO 2010033297 A2 describes telescoped resin-impregnated fiber tubes or resin-impregnated fiber tubes arranged one on top of the other. At the inner surface a polymer tubular foil may be inserted. This polymeric inner tubular foil may have a thickness ranging between 0.1 and 1 mm. This tube may further be made of polyamide. The tube may be connected at its ends with the respective ends of the fiber tubes by sewing, for example. This is disadvantageous in that the foil is loosely inserted in the fiber tube and is thus susceptible to damage.

DE 19924251 A1 describes a foil tube where a layer of non-woven material is laminated to the polymer foil. This foil tube is placed around the outer surface of the actual lining tube. This outer foil tube constitutes an armoring adapted to protect against mechanical influences of the pipe inner wall to be rehabilitated. As in other prior art, the inner surface is provided with a polymeric inner tubular foil. This system thus has the same disadvantages as the prior art described above. This document further describes that this polymeric inner tubular foil can shift with respect to the lining tube. The lining tube described in this document is not invertible since it is made up of a wound glass fiber mat and would fall apart when being pushed into a pipe to be rehabilitated by an inversion process. Since this lining tube is made up of wound mats, neither an outer foil nor an inner tubular foil can be reliably connected with the impregnated fiber tube.

The present technology is described in ASTM F1216-09.

In prior art it has so far not been worked out how to configure the inner tubular foil such that it is less susceptible to damage and may remain in the liner after installation, which would result in an optimization of processes performed on site since removing and disposing of the inner tubular foil would be omitted.

SUMMARY OF THE INVENTION

It is an object of the present invention to provide a fiber tube for internally lining conduits and pipes wherein damage of the inner tubular foil during hardening can be better prevented and the foil may remain in the liner after hardening, which would result in an optimization of the processes performed on site.

According to a first embodiment, this object is achieved with an impregnated fiber tube adapted for inner lining of conduits and pipes, said fiber tube comprising:
a. an outer layer,
b. a resin-impregnated fiber tube layer,
c. an anchoring layer, and
d. an inner polymer layer including at least one barrier ply, wherein the inner polymer layer comprises at least one longitudinal seam.

In prior art e.g. EP 1180225B1 describes that a foil tube may be laminated with an anchoring layer. However, it has turned out that in practice this cannot be reliably realized. When a foil tube is applied on an anchoring layer and the anchoring layer is then placed around the foil tube, the lamination process leaves unlaminated locations at least at both edges. These unlaminated locations exist along the entire tube and may lead to malfunction when inserting the liner.

Up to now a longitudinal seam of the inner polymer layer or foil has been considered a disadvantage. So far this longitudinal seam has been regarded as a weak spot in the finished product. However, the inventors of the present invention have found out that the use of at least one longitudinal seam of the inner polymer layer offers the advantage that thus a planar polymer layer may preferably be connected with e.g. an anchoring layer, such as a non-woven material, and in particular can be very reliably laminated over the entire surface thereof, or can be reliably glued to the non-woven material over the entire surface, for example. Subsequently, the planar polymer layer including at least one longitudinal seam may be shaped into a tube. This could not be done with prior art foil tubes. In prior art, defects which occurred when laminating the non-woven material to the foil could not be prevented.

The longitudinal seam of the inner polymer layer can be formed by a butt joint or by overlapping, for example. The longitudinal seam of the inner polymer layer may be a weld seam, for example. Preferably, the longitudinal seam extends in the direction of the tube.

Preferably, at least the anchoring layer c. and the inner polymer layer d. are connected with each other non-positively or by a substance-to-substance connection.

Since at least the layers c. and d. are preferably connected with each other non-positively or by a substance-to-substance connection, these layers cannot move with respect to each other as is the case in prior art. This considerably improves the stability of the overall layer setup. Further, the inner polymer layer is strongly reinforced by the anchoring layer connected therewith such that the inner polymer layer is no longer susceptible to damage.

The impregnated fiber tube according to the present invention is preferably invertible. The conventional fiber tubes, such as that known from EP 1180225 B1, is not invertible since in most cases the resin-impregnated fiber tube layer in conventional products is just loosely folded and thus falls apart during inversion. The impregnated fiber tube according to the present invention thus offers the advantage that the more inexpensive inversion process can be performed on this fiber tube.

In conjunction with the inversion process it should be noted that the setup of the liner before installation differs between the inversion process and the pull-in process. The sequence of the layers a. to d. of a liner provided for the pull-in process is the same as that of the layers after installation in the pipe. The sequence of the layers of an inversion liner before installation is, of course, a reverse order (i.e. d. to a.) with respect to the sequence of layers after installation. Since the same liner is concerned, both variants are covered by the present invention. In the context of this property right, the nomenclature a. to d. is used, wherein it is obvious that the inverted liner (sequence d. to a.) is also covered by the present invention.

The individual layers may comprise one or a plurality of plies and/or material sheets. These plies and/or material sheets are connected with each other over the entire surface, for example.

The outer layer a. preferably has a thickness ranging from 40 to 2000 µm. Preferably, the outer layer is not permeable to UV radiation such that the resin-impregnated fiber tube layer does not harden during storage or during transport, for example. The outer layer may be composed of polymer or a non-woven material with polymer laminated thereon, for example. As a material for polymer or non-woven material polyethylene or polypropylene can be used, for example.

The resin-impregnated fiber tube layer b. may have a thickness ranging from 2 to 30 mm. The fiber tube layer is preferably a non-crimp fabric, a woven material, a mat, a knitted fabric, a non-woven material, a felt, a knitted or crocheted fabric, or a combination or a multi-ply setup of these textile fabrics. The material of the fibers of the resin-impregnated fiber tube layer is preferably selected from glass, carbon, aramid, gel-spun polyethylene (Dyneema®, for example), PAN, thermoplastic polymer or mixtures thereof. Thermoplastic fibers may be made of polypropylene, polyethylene or polyester, for example. The material of the resin can be selected from the group consisting of unsaturated polyester resins, vinyl ester resins, epoxy resins or mixtures thereof.

The anchoring layer c. which is preferably made of a thermoplastic material, preferably has a thickness ranging from 10 to 5000 µm, more preferably 30 to 500 µm. The anchoring layer is preferably made of a non-woven material or a hot-melt adhesive, or a combination of theses variants. Most preferably, the non-woven material is made of glass, thermoplastic materials, PAN, or mixtures thereof. The thermoplastic materials are selected from polyethylene, polypropylene or polyester, for example. The hot-melt adhesive is polyamide, polyethylene, APAO (amorphous polyolefin), EVAC (ethylene-vinyl acetate copolymer), TPE-E (polyester elastomer), TPE-U (polyurethane elastomer), TPE-A (copolyamide elastomer) or vinyl pyrrolidone/vinyl acetate copolymer and mixtures thereof, for example.

The inner polymer layer d. preferably has a thickness ranging from 100 to 1500 µm. More preferably, the inner polymer layer has a thickness ranging from 100 to 600 µm. Thus this inner polymer layer can, on the one hand, be protected against mechanical damage caused by the device for hardening the resin-impregnated fiber tube layer, for example, but, on the other hand, is thin enough to transmit enough heat or UV radiation for hardening purposes. Preferably, this inner polymer layer comprises a plurality of plies. One of these plies is a barrier ply. This barrier ply is adapted to prevent diffusion of reactive diluents, such as styrene, of unhardened resin. Preferably, this barrier ply is one of the plies of the polymer layer which is not arranged outside (herein "outside" means "visible to the viewer" and/or "adjacent to the anchoring layer"). The barrier ply includes at least 50% by weight of polyamide, ethylene-vinyl alcohol copolymer, PBT, PET, halogenated polymers, or mixtures thereof, and is preferably made of these materials. More preferably, the barrier ply is made of one or more of these materials. Preferably, the barrier ply has a thickness ranging from 10 to 500 µm.

Various advantages of the barrier ply according to the present invention become apparent in comparison with prior art, in particular in comparison with felt liners which comprise on their inner surface a permanently adhering layer of PE, PP or PUR which does not provide or provides only an inadequate sealing effect towards reactive diluents, such as styrene, since styrene diffuses through the coating and concentrates at the surface. This leads to two consequences:

1.) When hardening is effected using hot water or steam, the process water includes significant amounts of styrene which must be treated or separately disposed of at considerable expense to prevent environmental contamination.

2.) When hardening is effected using UV light, serious safety problems arise since the lower explosion limit of styrene with air is exceeded within a few hours.

The new barrier ply according to the present invention provided in the inner polymer layer, which is preferably connected with the liner non-positively or by a substance-to-substance connection, allows for the first time for an environment-friendly rehabilitation of pipes by a liner-based rehabilitation process. Further, it is possible for the first time to use UV-hardenable resins and radical generators.

In an alternative embodiment, the polymer layer can also be made up of a barrier ply.

Preferably, the inner polymer layer comprises at least one, and preferably two outer plies (herein "outer" means "visible to the viewer" and/or "adjacent to the anchoring layer") of polyurethane, polyethylene or polypropylene. Preferably, this outer ply has a thickness ranging from 50 to 1000 µm. For example, the outer ply (as an adherent ply, for example) arranged adjacent to the anchoring layer may be thinner than the other outer ply facing the tube center (a wearing ply, for example). Thus the inner polymer layer can offer even better protection against mechanical influences.

Between the inner polymer layer d. and the anchoring layer c. another layer of thermoplastic polymer, such as polypropylene or polyethylene, may be provided, for example. This layer may be extruded, for example. Preferably, the molecular weight of the material of this layer is lower than the molecular weight of the material of the adjacent ply of the inner polymer layer to allow for a high degree of flowability and thus of non-positive connection.

Substance-to-substance connection or non-positive connection within the meaning of the present invention may advantageously mean that the respective layers are subjected to lamination, layup or gluing to each other either over the entire surface or in part. If the layers are partly connected with each other, preferably at least 40% of the surface of the layers are connected with each other, or are alternatively connected with each other at selective spots. In contrast to prior art, the layers can thus be completely prevented from slipping out of position with respect to each other. Additionally or alternatively, the layers can be connected such that a highly flowable thermoplastic material is extruded between the layers during manufacture.

Preferably, at least the resin-impregnated fiber tube layer is not wound or folded. Preferably, none of the layers is wound or folded. Rather, at least the resin-impregnated fiber tube layer preferably comprises at least one longitudinal seam. Preferably, at least this layer is longitudinally welded, sewn, knitted or glued. This offers the advantage that an impregnated fiber tube including such a fiber tube layer is hardly extendable in longitudinal direction and is thus particularly well suited for the inversion process. In contrast, a wound resin-impregnated fiber mat has the disadvantage that when the tube is pushed into a pipe during an inversion process, the wound plies shift of simply fall apart. Preferably, at least this layer is contiguous.

In the resin-impregnated fiber tube layer the resin is preferably not or is only partly through-polymerized. The composition of the resin preferably includes 0.1 to 20 weight proportions of a thickening agent and in particular of an isocyanate in relation to 100 weight proportions of resin. The inventors have determined that through this the composition of the resin is sufficiently thickened for use in rehabilitating pipes, but is liquid enough during manufacture to completely permeate the anchoring layer and the fiber tube layer.

Preferably, as the innermost layer inside the tube a layer of polyethylene, polypropylene or polyurethane is arranged as an outer ply of the inner polymer layer. Adjacent thereto a barrier ply is preferably provided as a ply of the inner polymer layer. Preferably, a layer of polyethylene or polypropylene may be provided as another ply of the inner polymer layer between the anchoring layer c. and the barrier layer.

In another embodiment, the object of the present invention is achieved by a method of manufacturing the fiber tube according to the invention, wherein
a) a material sheet of the anchoring layer and a material sheet of the inner polymer layer in the end product are connected with each other non-positively or by a substance-to-substance connection, and
b) a material sheet of the outer layer is arranged such that it is located at an outermost position in the end product, and
c) at least one of the material sheets is longitudinally connected at the outer edges with or without overlapping by at least one longitudinal seam.

Preferably, at least two, more preferably at least three of the material sheets are connected with each other in step c). Among those there may be two plies of the fiber tube layer, for example. Thus the produced fiber tube can be strongly stabilized and is much better suited for an inversion process. For example, in the method according to the present invention glass fiber mats are used as the material of the one or the plurality of plies of the fiber tube layer.

To attain a better connection of the individual layers or a better connection of the glass with the resin, for example, common adhesives, such as silanes, or the corona method may be applied.

In another embodiment, the object of the present invention is achieved by a method of rehabilitating pipes, wherein a fiber tube according to the present invention is inserted into a pipe to be rehabilitated, pressed with compressed air against the inner wall of the pipe, where the resin of the resin-impregnated fiber tube layer subsequently hardens.

In another embodiment, the object of the present invention is achieved by use of the fiber tube according to the invention for rehabilitating sewers, pipes or conduits.

In another embodiment, the object of the present invention is achieved by a rehabilitated conduit, sewer or pipe which comprises a hardened fiber tube according to the invention at the inner surface of the pipe.

a. an outer layer 3,
b. a resin-impregnated fiber tube layer 5,
c. an anchoring layer 7, and
d. an inner polymer layer 9,
wherein the anchoring layer and the inner polymer layer are connected with each other non-positively or by a substance-to-substance connection.

Figure 1:
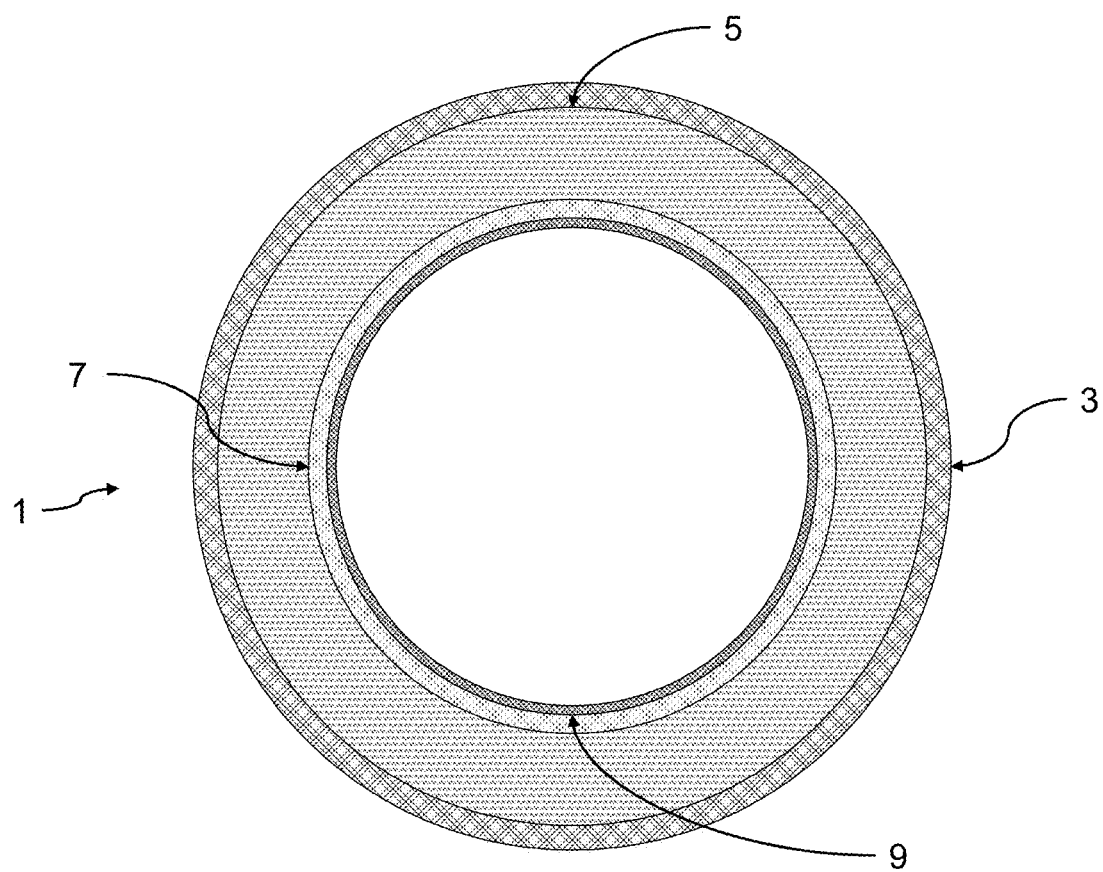
FIG. 1 shows an invertible impregnated fiber tube (liner) 1 for internally lining conduits and pipes, the fiber tube comprising the following.
Figure 2:
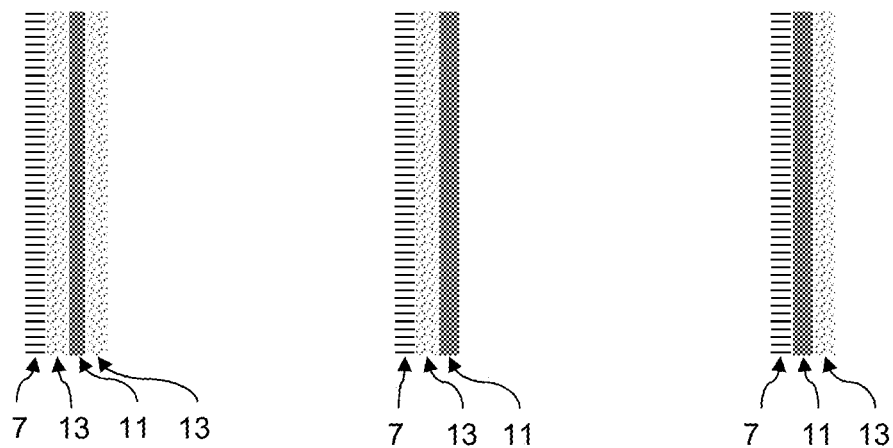

FIG. 2 shows various variants of a setup of the inner polymer layer 9 with respect to the anchoring layer 7. A barrier layer 11 of PA, for example, may be sandwiched between two plies 13 of PE, PP or PU with one of the plies 13 adjoining the anchoring layer 7. Alternatively, the inner polymer layer 9 may be simply composed of a ply 13 adjoining the anchoring layer and a barrier layer 11 arranged at an outermost position on the visible side. As a further alternative, the barrier ply 11 may adjoin the anchoring layer 7, and inside the inner polymer layer 9 a layer 13 arranged on the outside on the visible side may be provided.

DETAILED DESCRIPTION OF A PREFERRED EMBODIMENT OF THE INVENTION

For manufacturing the impregnated invertible fiber tube (liner) according to the present invention, a 300 µm thick foil of polypropylene was applied to one side of a 1 m wide and 20 m long sheet of a 5 mm thick glass-fiber non-crimp fabric, which were later glued to each other. On the other side was applied a combination, welded with a longitudinal weld extending towards the tube, of a 100 µm thick layer of a polypropylene non-woven material on which a 300 µm foil comprising three plies of polyethylene, polyamide and polyethylene of the same thickness of 100 µm each was laminated. Subsequently, the two longitudinal edges of the glass-fiber non-woven material were connected with each other by sewing such that a 20 m long fiber tube according to the present invention was created. This tube was then impregnated with a commercially available UV-initiated UP resin for the purpose of relining under vacuum. The resin comprised the usual additives such as, inter alia, wetting additives, air release additives and isocyanates for thickening purposes.

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

REFERENCE NUMERALS

1 Impregnated fiber tube (liner)
3 Outer layer (a.)
5 Resin-impregnated fiber tube layer (b.)
7 Anchoring layer (c.)
9 Inner polymer layer (d.)
11 Barrier ply, part of the inner polymer layer
13 Ply of polymer, part of the inner polymer layer

What is claimed is:
1. An impregnated fiber tube for internally lining conduits and pipes, said fiber tube comprising:
an outer layer;

a resin-impregnated fiber tube layer within the outer layer and contacting the outer layer that is longitudinally welded, sewn, knitted or glued;

a nonwoven anchoring layer within the resin-impregnated fiber tube layer and contacting the resin-impregnated fiber tube layer, wherein the anchoring layer is made of a thermoplastic material; and an inner polymer layer within the anchoring layer and contacting the anchoring layer, the inner polymer layer including a barrier layer including at least 50 percent by weight of polyamide, ethylene-vinyl alcohol copolymer, PBT, PET halogenated polymers, or mixtures thereof, the inner polymer layer including the barrier layer, an inner ply on one side of the barrier layer, and an outer ply on an opposite side of the barrier layer, wherein the outer ply contacts the anchoring layer, wherein at least the anchoring layer and the inner polymer layer are connected with each other by a substance-to-substance connection, wherein the inner polymer layer forms an innermost layer within the impregnated fiber tube.

2. The fiber tube according to claim 1, wherein the outer layer is not permeable to UV radiation, wherein the outer layer forms an outermost layer of the impregnated fiber tube.

3. The fiber tube according to claim 1, wherein the outer layer is not permeable to UV radiation, wherein the material of the fibers of the resin-impregnated fiber tube layer is selected from at least one of glass, carbon or aramid.

4. The fiber tube according to claim 1, wherein the substance-to-substance connection is a lamination.

5. The fiber tube according to claim 1, wherein the substance-to-substance connection is provided over an entire surface of the anchor layer.

6. A rehabilitated pipe which comprises a hardened impregnated fiber tube according to claim 1 installed at an inner surface of the rehabilitated pipe, wherein the anchoring layer remains in place in the rehabilitated pipe after the installation.

7. The impregnated fiber tube according to claim 1, wherein the resin-impregnated fiber tube layer is not wound or folded.

8. The impregnated fiber tube according to claim 1, the at least one barrier ply has a thickness of approximately 10 micrometers to approximately 500 micrometers, wherein the inner ply and the outer ply of the inner polymer layer include at least one of polyurethane, polyethylene or polypropylene.

9. The impregnated fiber tube according to claim 1, wherein at least 40 percent of a surface of the anchoring layer and a surface of the inner polymer layer are connected with each other, and wherein the anchoring layer and the inner polymer layer are completely prevented from slipping out of position with respect to each other.

10. An impregnated fiber tube installed within a conduit or pipe, said fiber tube comprising:

an outer layer;

a resin-impregnated fiber tube layer that is longitudinally welded, sewn, knitted or glued, wherein the resin-impregnated fiber tube layer is not wound or folded;

a nonwoven anchoring layer; and an inner polymer layer formed of multiple layers, the multiple layers including two plies with a barrier layer between the two plies, wherein at least the anchoring layer and the inner polymer layer are connected with each other by a substance-to-substance connection, wherein the inner polymer layer forms an innermost layer of the impregnated fiber tube as installed.

11. The impregnated fiber tube of claim 10, wherein the anchoring layer remains in place after the installation of the impregnated fiber tube within the conduit or the pipe.

12. An impregnated fiber tube for internally lining conduits and pipes, said fiber tube comprising:

an outer layer;

a resin-impregnated fiber tube layer within the outer layer and contacting the outer layer that is longitudinally welded, sewn, knitted or glued;

a nonwoven anchoring layer within the resin-impregnated fiber tube layer and contacting the resin-impregnated fiber tube layer, wherein the anchoring layer is made of a thermoplastic material, the anchoring layer having a thickness between 30 micrometers and 500 micrometers; and an inner polymer layer within the anchoring layer and contacting the anchoring layer, the inner polymer layer including a barrier layer including at least 50 percent by weight of polyamide, ethylene-vinyl alcohol copolymer, PBT, PET halogenated polymers, or mixtures thereof, the inner polymer layer including the barrier layer, an inner ply on one side of the barrier layer, and an outer ply on an opposite side of the barrier layer, wherein the outer ply contacts the anchoring layer, wherein at least the anchoring layer and the inner polymer layer are connected with each other by a substance-to-substance connection, wherein the inner polymer layer forms an innermost layer within the impregnated fiber tube.

13. The impregnated fiber tube according to claim 12, wherein the inner polymer layer has a thickness between 100 micrometers and 1500 micrometers.

14. The impregnated fiber tube according to claim 13, wherein the barrier layer within the inner polymer layer has a thickness between 10 micrometers and 500 micrometers.

15. The impregnated fiber tube according to claim 14, wherein the outer ply has a thickness between 50 micrometers and 1,000 micrometers.

* * * * *